July 15, 1969  H. I. SHRUBSALL  3,456,089
SUBMERGED MELT ELECTRIC WELDING SYSTEM
Filed April 29, 1966

INVENTOR
HARRY I. SHRUBSALL
BY
Barnwell P. King
ATTORNEY

United States Patent Office 3,456,089
Patented July 15, 1969

3,456,089
SUBMERGED MELT ELECTRIC WELDING SYSTEM
Harry I. Shrubsall, Scotch Plains, N.J., assignor to Union Carbide Corporation, a corporation of New York
Filed Apr. 29, 1966, Ser. No. 546,458
Int. Cl. B23k 9/10, 9/18, 25/00
U.S. Cl. 219—73                  4 Claims

ABSTRACT OF THE DISCLOSURE

A submerged melt multi-electrode seam welding system includes 3 electrodes in line which are fed independently into a common welding pool. The first 2 electrodes are Scott-connected to a 3-phase supply circuit while the third electrode is connected to a separate energizing means whereby increased welding speeds can be achieved without undesirable undercutting.

---

This invention relates to work-in-circuit submerged melt seam welding and more particularly to a system for such welding with three electrodes of consumable metal that are fed into a common pool of weld-material on the work.

The invention provides individual means for feeding a lead electrode, a middle electrode and a trail electrode toward the common pool of weld metal and welding composition on the seam in the work to be welded, and means for advancing such work and all of said electrodes relatively along such seam as the welding operation progresses under the blanket of granular submerged-melt welding flux. Two Scott-connected transformers have their primary windings connected to a three-phase supply circuit, and their secondary windings connected to the work (ground) the middle electrode and one of the other two electrodes. Separate means energize the other one of said electrodes.

The main object of the invention is to provide a system in which the welding seam speed is substantially increased by virtue of the fact that the operation is stable as distinguished from one that is explosive, and the surface of the resulting weld is relatively smooth, continuous, and substantially free of undesirable undercutting.

Figure 1:
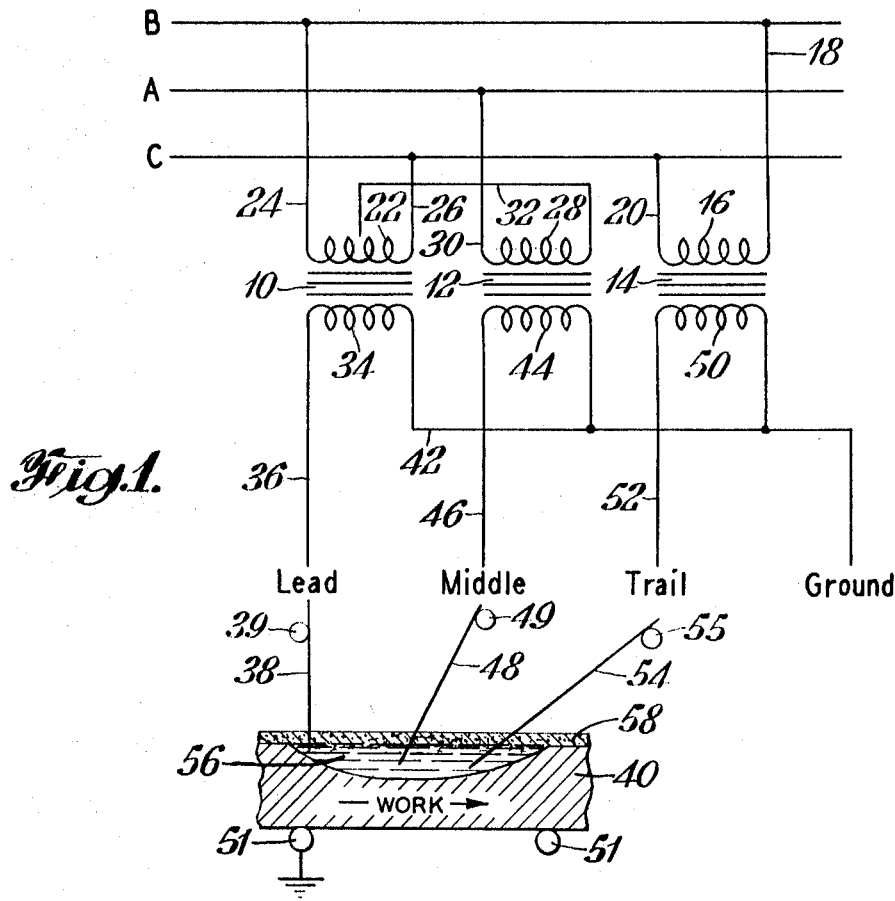
FIGURE 1 is a circuit diagram of a preferred system of the invention.
Figure 2:
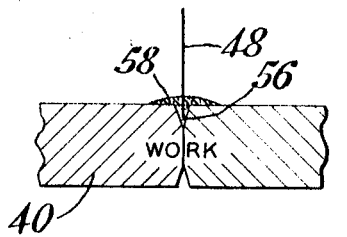
FIGURE 2 is a fragmentary cross-section of the weld joint.

As shown in FIGURE 1 of the drawings, two single-phase transformers 10 and 12 are Scott-connected to each other and to lines A, B and C of a three-phase A.C. power source, while a third single-phase transformer 14 is not so-connected but is simply connected to lines B and C. Thus, primary 16 of transformer 14 is connected by leads 18 and 20 to lines B and C; and primary winding 22 of transformer 10 is connected by leads 24 and 26 to lines B and C; while the primary winding 28 of transformer 12 is connected by lead 30 to line A and by lead 32 to the center of the primary winding 22.

The secondary winding 34 of transformer 10 is connected by circuit 36 of a lead electrode 38 and to work 40 by a ground circuit 42. Similarly secondary winding 44 of transformer 12 is connected by circuit 46 to a middle electrode 48 and to said ground circuit 42; and secondary winding 50 of transformer 14 is connected by circuit 52 to a trail electrode 54 and to the ground circuit 42.

The electrodes are fed by individual means 39, 49 and 55 toward a common pool 56 of weld metal in the V-groove provided at the joint in the work being welded, under a blanket 50 of granular submerged melt welding flux as the operation progresses along the welding seam. Such progression results from movement of the work 40 longitudinally in the direction of the seam by drive means 51.

One O.D. mill was set up with three welding heads in tandem and welding power supplied by three 1500 ampere transformers. Welding tests were conducted using 30 inch diameter ⅜-in. wall thickness pipe, 40 ft. long. The initial welds were made with the lead wire connected single phase, the middle and trail wires were Scott-connected. A multipower hookup of this nature offers many combinations of phase rotation and phasing between the currents in each leg. In order to arrive at the best electrical connection in regards to phase rotation and proper phasing between currents, the three-phase primary and secondary on the Scott-connected wires were not changed. Alone, this system produces the correct phase rotation with a fixed ground current in relation to the magnitude of the two welding currents used on the two welding wires.

However, when adding the third welding wire connected to a single A.C. phase hookup, the fixed factor on a Scott system, such as the phasing between welding currents, can be altered, depending on the primary connection on the single-phase A.C. transformer, the phase rotation will not be affected. In this particular installation, the recommended rotation of lead, trail, and ground (clockwise) was adhered to. By changing the primary connection on the single phase, single wire transformer, it was possible to obtain a zero rotation, clockwise rotation or counterclockwise rotation as measured between the three welding wires. A standard type phase meter was used to determine phase rotation.

The total amount of ground current also changed (no change in welding amperes) depending on the single phase primary connection. For example, when connected to primary lines AB the phase rotation was counterclockwise with the ground current being over 1000 amperes. Keeping the welding conditions approximately the same and changing the BA lines, the phase rotation was clockwise with a ground current of about 500 amperes. Connections CB gave over 1300 amperes as did BC. The phase rotation on CB was clockwise whereas the rotation with BC was zero. The BC produced the best weld results of this series.

Typical welding conditions using three $\frac{5}{32}$-in. diameter electrode wires are as follows:
Lead—960–28 (single phase A.C.).
Middle—850–28 (Scott A.C.).
Trail—750–30 (Scott A.C.).
Ground—1300+.
Welding Speed—101 i.p.m.-zero phase rotation.
Grade 85 welding composition.

A double check on the ground currents (measured with a 1000 ampere tong type meter) indicated that CB primary produced the highest ground current. In multipower welding, the weld quality is affected by the amount of current carried in the ground leg. The maximum value with good weld quality is preferred.

In order to further the investigation, the single wire single phase connection was positioned in back of or trailing the two Scott connected wires as shown in FIGURE 1. For these tests a current transformer and ammeter were installed in the ground leg. Full length pipes (40 ft. long) were satisfactorily welded at 101 i.p.m. using either a $\frac{5}{32}$-in. diameter or $\frac{1}{8}$-in. diameter wire on the trail head. This is an increase of 50 percent in welding speed as compared to the prior two wire Scott connected hookup.

Additional pipes were satisfactorily joined at 106, 110, 112 and 117 i.p.m. The latter speed is maximum for this O.D. mill. This series of welds were made using 5/32-, 1/8- and 11/64-diameter wires in that order, in conjunction with a mixture of about 20 percent Linde Grade 60 and 80 percent Linde Grade 85 welding composition. This composition improved the general weld appearance, by reducing surface pockmarks, slightly better edge wetting, and giving a somewhat smoother weld surface than obtained with Linde Grade 85 welding composition.

Summary of results:

(1) Proper phasing of the single wire, single phase A.C. transformer is necessary for obtaining good welds at high welding speeds.

(2) Best process results were obtained with the single wire trailing the two wire Scott-connected system.

(3) An improvement in weld quality was obtained when approximately 20 percent Linde Grade 60 was added to Linde Grade 85 composition.

(4) A welding speed of 125 i.p.m. or higher should be possible with the recommended A.C. three wire connection.

(5) An increase of 62.5 percent in welding speed was obtained with the three wire system as compared to the two wire Scott connection.

Figure 3:
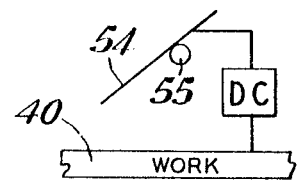
FIGURE 3 is a circuit diagram of a modification in which D.C. is used to energize the trail electrode.

As shown in FIGURE 3, the trail electrode 54 and the work 40 are connected to a D.C. power supply instead of to a single phase source, so as to be energized by direct current instead of A.C. Similarly, the lead electrode may be energized by direct current. In any case, the middle electrode and the other electrode are energized by Scott-connected transformers.

The invention thus provides the novel combination of two Scott-connected transformers for energizing two electrodes one of which is the middle electrode, with separate means for energizing either the lead electrode or trail electrode in a three-electrode system in which the work is ground connected to the separate energizing means as well as to the Scott-connected transformers. As a result, the welding seam speed is substantially increased by virtue of the fact that the operation is stable as distinguished from one that is explosive, and the surface of the resulting weld is relatively smooth, continuous, and substantially free of undesirable undercutting.

What is claimed is:

1. A submerged-melt multi-electrode seam welding system, comprising the combination of means for feeding a lead electrode, a middle electrode and a trail electrode toward a common pool of weld metal and welding composition on the seam in the work to be welded, and means for advancing such work relatively to all of said electrodes in the direction of such seam as the welding operation progresses under a blanket of granular submerged-melt welding composition, of two Scott-connected transformers having their primary windings connected to a three-phase supply circuit and their secondary windings connected to the work (ground) the middle electrode and the leading electrode, and separate energizing means connected to the trailing electrode and to the work.

2. A system as defined by claim 1, in which said separate energizing means comprises a single phase transformer.

3. A system as defined by claim 1, in which said separate energizing means comprises a direct current source.

4. A system as defined by claim 1, in which the two Scott-connected transformers have their primary windings connected to A, B and C leads of the three-phase supply circuit, so that phase rotation of the voltages at the welding arcs are in clockwise direction in order of lead electrode, middle and ground, and the separate energizing means comprises a single phase transformer having its primary winding connected to leads B and C of such circuit, and its secondary winding connected to the other of said electrodes and such work, whereby the welding seam speed is substantially increased by virtue of the fact that the operation is stable as distinguished from one that is explosive, and the surface of the resulting weld is relatively smooth continuous and substantially free of undesirable undercutting.

References Cited

UNITED STATES PATENTS

| | | | |
|---|---|---|---|
| 2,436,387 | 2/1948 | Harter et al. | 219—137 X |
| 2,837,627 | 6/1958 | Soulary | 219—130 X |

ANTHONY BARTIS, Primary Examiner

J. G. SMITH, Assistant Examiner

U.S. Cl. X.R.

219—130, 131